United States Patent [19]

Moberg et al.

[11] Patent Number: 4,794,459

[45] Date of Patent: Dec. 27, 1988

[54] COLUMNAR FOCUSING INDICATOR FOR A MANUALLY FOCUSED VIDEO CAMERA

[75] Inventors: Gregory O. Moberg, Rochester; Wilfred D. Rhodes, W. Webster; Keith R. Surdyke, Bergen all of N.Y.

[73] Assignee: Eastman Kodak Company, Rochester, N.Y.

[21] Appl. No.: 138,890

[22] Filed: Dec. 28, 1987

[51] Int. Cl.$^4$ ...................... H04N 5/232; H04N 5/30
[52] U.S. Cl. .................... 358/227; 358/224; 354/409
[58] Field of Search ............... 358/227, 224, 221, 209, 358/168, 170, 171, 172; 354/400, 409, 471

[56] References Cited

U.S. PATENT DOCUMENTS

| | | | |
|---|---|---|---|
| 3,435,136 | 3/1969 | Bachmann. | |
| 4,282,548 | 8/1981 | Plummer | 358/227 |
| 4,317,135 | 2/1982 | Pitruzzello | 358/227 |
| 4,392,726 | 7/1983 | Kimura | 358/227 |
| 4,463,384 | 7/1984 | Fujikawa | 358/227 |
| 4,481,540 | 11/1984 | Bergen | 358/227 |
| 4,484,225 | 11/1984 | Bishop | 358/227 |
| 4,583,123 | 4/1986 | Baier | 358/227 |
| 4,586,090 | 4/1986 | Wilman | 358/227 |
| 4,599,653 | 7/1986 | Kimura | 358/224 |

FOREIGN PATENT DOCUMENTS

52-369  1/1977  Japan ........................ 358/227

Primary Examiner—Tommy P. Chin
Attorney, Agent, or Firm—David M. Woods

[57] ABSTRACT

A focusing aid for a manually-focused video camera provides an indication of optimum focus by switching the d.c. level of the video signal between two values according to its high frequency content. The switched d.c. levels generate a brightness transition that is confined to a columnar region occupying one side of the display in an electronic viewfinder. A high frequency component is separated from the video signal and converted into a d.c. control signal having an amplitude that varies with frequency content. By accumulating the d.c. control signal for each video field and switching a voltage divider in response to the amplitude of the accumulated control signal, a transition between d.c. levels is generated that is time-wise dependent upon high frequency content. The switched d.c. level is injected into the video signal during the scanning of the column. The resulting transition between video levels is seen as an abrupt brightness shift that moves up or down in the column in relation to high frequency content. Optimum focus is obtained by adjusting the focus and bringing the transition to its lowermost position in the column.

13 Claims, 8 Drawing Sheets

COLUMNAR FOCUSING INDICATOR FOR A MANUALLY FOCUSED VIDEO CAMERA

BACKGROUND OF THE INVENTION

1. Field of the Invention

This invention relates to a focusing arrangement for a video camera, and especially to an arrangement for aiding manual focusing through an electronic viewfinder. More specifically, the invention pertains to a signal processing circuit of the type that isolates a focus-related characteristic of a video signal and uses the isolated characteristic to visually modify the display in the viewfinder.

2. Description Relative to the Prior Art

In a manually focused video camera, an electronic viewfinder is not only used to compose a scene as recorded by the camera but also to determine when the scene image is properly focused. The proper focus, however, is not a discrete distance but a range of distances through which the image is acceptably defined, i.e., a range indicated by the depth of field for a particular optical (lens) aperture and subject distance. An electronic viewfinder repeats images of the scene at the television frame rate, i.e., 1/30 second. This "exposure interval" dictates a particular lens aperture for the existing light condition and, therefore, establishes a particular depth of field for each subject distance. A special problem emerges when the viewfinder is used with a video still camera, which provides several exposure interval and aperture combinations for each light condition. The light condition that dictates a certain aperture . . . and thus a certain depth of field . . . for the electronic viewfinder may require an entirely different aperture for the still exposure (because the exposure interval may not be 1/30 second). Thus the depth of field for viewing may be an artificial indication of the actual picture-taking condition. The "real" depth of field may be considerably compressed from that observed in the viewfinder with the attendant possibility that a properly-focused viewfinder display may be unfocused with respect to the recorded picture.

If one could reliably locate the central focus position for the displayed depth of field, the picture would be in focus for any aperture (that is, for any depth of field). Owing, however, to the small size of the display screen in the viewfinder and the limited bandwidth available for the display, differences between details shown on the viewfinder screen are not very sharp or clear. Searching for optimum focus, necessary in view of the depth of field considerations heretofore mentioned, is a procedure marked by uncertainty.

U.S. Pat. No. 4,660,092 suggests one arrangement for dealing with such problems and finding the central focus position. A high frequency component of a luminance signal generated by a video camera is converted into a d.c. control signal having an amplitude that varies with high frequency content. By using the control signal to adjust the gain applied to the luminance signal in a central area of the viewfinder display, the contrast of the picture in the central area is accentuated according to the degree of focus. In practice, however, a contrast change in the tiny viewfinder display is insufficient for focusing differences to be visually striking.

SUMMARY OF THE INVENTION

Ser. No. 138,785, assigned to the assignee of the present application and filed on even date therewith, proposes a focusing arrangement in which video brightness is varied according to the high frequency content of the video signal. The brightness variation is confined to a focusing slit occupying a small area of the display in the viewfinder. Optimum focus is obtained by adjusting the focus and bringing the video in the focusing slit to maximum brightness. A video focusing aid of this type provides a kind of "dead-band", especially for greater depths-of-field, in which little change of the visual indicator—either contrast or brightness—is observed as the focus is adjusted. Central focus remains a matter of estimation, albeit a better estimate based on a more accurate determination of the range of acceptable focus.

Instead of allowing the brightness to continuously vary, the visual impact of the acceptable focus range is enhanced by switching the video brightness between two levels dependent upon high frequency content for each repetition of the video image. This is especially effective if the switching is confined to a part of each line scan so that the raster area devoted to the brightness transition becomes a columnar region as the raster is scanned line-by-line. The brightness transition will occur at a position or "level" in the column that "rises and falls" with high frequency content. In effect, a bar is produced having a height that reflects the degree of focus.

In keeping with the present invention, a control signal is generated that varies according to the high frequency content of the video signal as the image is brought into focus. The control signal is accumulated over time by, for example, charging a capacitor. Then, in response to the amplitude of the accumulated control signal, the d.c. level of the video signal generating the viewfinder display is changed. This produces a corresponding transition in brightness level in the viewfinder display. By resetting the capacitor in relation to the video image repetition rate, e.g., with every vertical sync pulse, the timing of the brightness shift is independent of the image scan. If the active period of the brightness transition is restricted to a portion of each line scan, the focus aid is displayed as a column with two distinct brightness levels and an intervening transition that responds to focus adjustment.

BRIEF DESCRIPTION OF THE DRAWINGS

The invention will be described with reference to the drawings, wherein.

DESCRIPTION OF A PREFERRED EMBODIMENT

Figure 1:
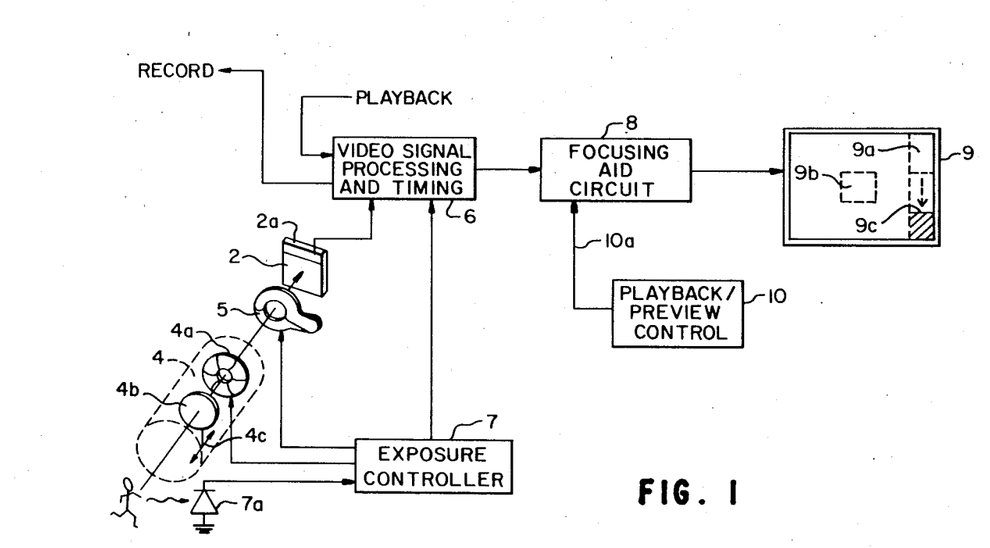
FIG. 1 is a diagram of pertinent portions of a video camera, including components of a focusing aid in a viewfinder in accordance with the invention.

FIG. 1 identifies the basic elements of a video camera with special attention to a focusing aid of the type embodied by the invention. Other elements of the camera, either omitted or not shown in detail, may be readily selected from like elements known in the art. For example, the entire record and playback sections of the camera, which are unessential to an understanding of the invention, may be provided by ordinary components well known in this art. Moreover, although the focusing aid is disclosed in connection with a still video camera, the invention is not necessarily related to the mode of recording and, for example, could be similarly useful with a motion video camera.

Referring now to FIG. 1, a subject is imaged upon an image sensor 2 by an imaging assembly 4. Within the assembly 4 is a diaphragm 4a for controlling the optical aperture of the assembly, i.e., for determining the amount of imaging light to reach the sensor 2. Also included in the assembly 4 is a lens system 4b that is manually movable according to an arrow 4c in order to focus an image of the subject upon the sensor 2. (The imaging assembly 4 is typically a barrel-like structure having a knurled exterior ring connected by conventional gearing to the lens system 4b for adjusting the focus setting.) A light shutter 5 is interposed between the imaging assembly 4 and the sensor 2 for controlling the exposure interval. The sensor 2 is, for example, an interline transfer sensor having a horizontal register 2a from which a video signal is removed line-by-line in a known manner.

The video signal obtained from the sensor 2 is applied to a video signal processing and timing circuit 6, which includes the necessary matrices and circuits for generating luminance and color difference signals corresponding to the image. The level of exposure is controlled by an exposure controller 7, which receives light information from an exposure diode 7a and uses that information to control the diaphragm 4a and the shutter 5. Both luminance and color difference signals are directed to the record section, which is not further described. Alternatively, a playback signal conventionally reproduced from a recording medium (not shown) may be applied to the processing and timing circuit 6.

The luminance signal originating with either the sensor 2 or the playback circuit (not shown) is channelled through a focusing aid circuit 8 to a monochrome electronic viewfinder 9. A playback/preview control circuit 10 provides a select signal on a line 10a to activate the focusing aid circuit 8 when the viewfinder is previewing an image from the sensor 2. At other times, i.e., during playback of a previously recorded picture, the focusing aid circuit 8 is inactive and the video signal passes through without modification. In accordance with the invention, the brightness of a columnar region 9a of the viewfinder display is controlled according to the magnitude of high frequency information derived from a central window 9b of the display. Preferably the region 9a is a vertical column including, for example, the end portion of each video line scan.

As will be shown in detail in connection with the subsequent figures, the focusing aid circuit 8 generates a d.c. control signal having a magnitude corresponding to high frequency content. In the preferred embodiment, the greater the high frequency content, the smaller the amplitude of the control signal. (Clearly, the invention could be adapted to a direct correspondence). The control signal (a current) is applied to a capacitor and accumulated (as a voltage) over each video field. When the accumulated control signal reaches a predetermined, fixed threshold, the d.c. level of the video signal is shifted; specifically, the d.c. level in the column 9a is switched from a low (dark) to a high (bright) level.

The scan time taken to reach the switching threshold is thus a measure of high frequency content. A short time corresponds to unfocused video, a longer time to better focus. Whatever the degree of focus, the time constant of the capacitor circuit is selected so that at some point in each raster scan the accumulated signal exceeds the switching threshold and the lower d.c. level (dark level) is injected into the video signal. Though this switching can happen anywhere in the line scan, it is only allowed to feed through into the video signal during the column 9a. This produces an abrupt brightness transition 9c that "rises and falls" depending upon when the switching occurs, that is, depending upon the amount of high frequency in the video signal. Since the d.c. level switches from high to low, everything above the transition 9a is bright and everything below is dark.

Figure 2:
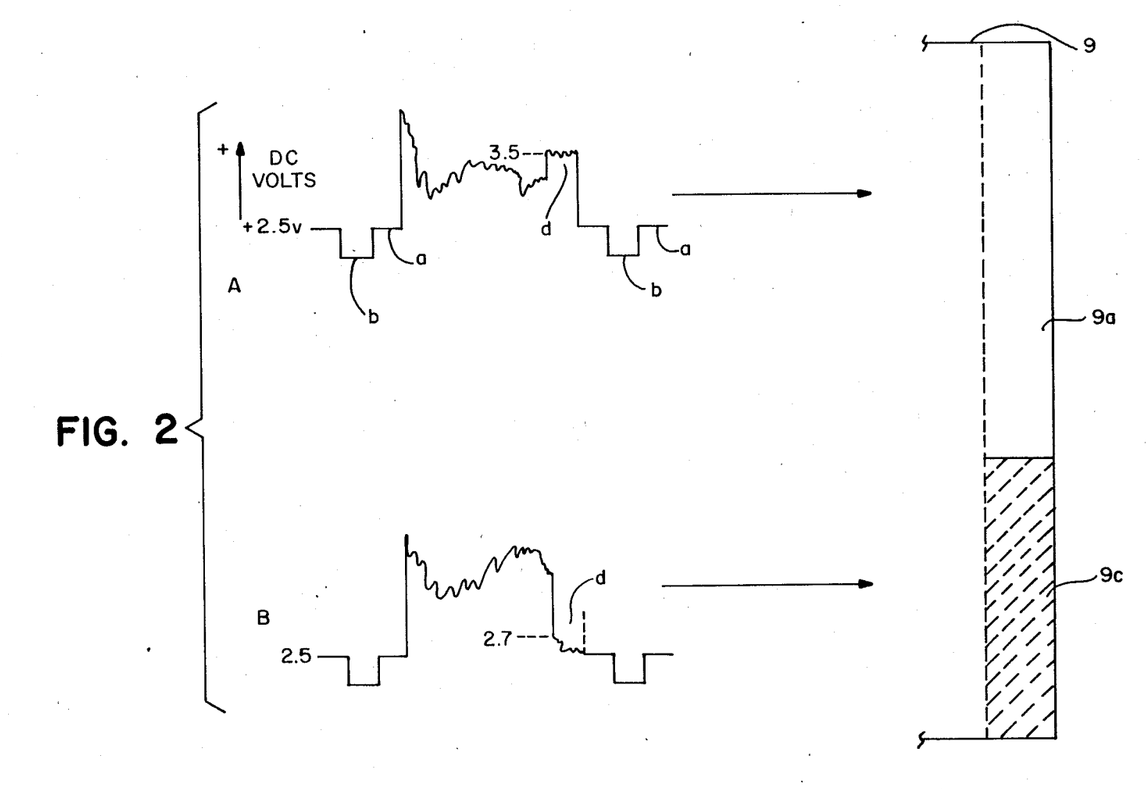
FIG. 2 is a pair of waveforms showing the effect of shifting the d.c. level in a video signal according to the invention.

The two waveforms in FIG. 2 represent two separate lines of video at two vertically separated positions in the column 9a. The back porch region "a" of the horizontal blanking interval is shown in FIG. 2A clamped to 2.5 volts d.c. (the tips "b" of the synchronization signal are also shown in FIG. 2A). Prior to reaching the switching threshold, the video signal is shown as in FIG. 2A, in which a d.c. level of 3.5 volts d.c. is combined with the video signal in the region d toward the end of the line scan. This produces a relatively bright background in the upper part of the column 9a. After the switching threshold is reached, a d.c. level of 2.7 volts d.c. is added into the video signal in the region d. As shown in FIG. 2B, this produces a relatively dark background. The transition 9c between the two levels visually appears as an abrupt edge between the two brightness levels.

In the preferred embodiment, the control signal is at a minimum for optimum focus, which means that the elapsed time in each field for the accumulated control signal to cross the switching threshold is at a maximum. This time corresponds with the lowermost position of the transition 9c. Consequently, as the lens system 4b is adjusted toward and through optimum focus, the transition 9c descends in the column 9a until it reaches its lowermost position and then begins to climb. The lowermost position, or the lowermost range of positions, is optimum focus. Depending upon the depth-of-field, the transition 9c will remain at its lowermost position as the lens system 4b is adjusted. Central focus is estimated in extreme depth-of-field situations by manually correlating the lens system 4b to the "middle" of the "deadband" positions of the transition 9c. At least some users find this technique preferable to those based on contrast or continuously variable brightness.

As shown by FIG. 2, the two d.c. levels added to the video signal in the column 9a do not completely brighten or darken the resulting display, that is, the underlying video image continues to show through the column 9a, albeit diminished in detail by the uniform brightness above and below the transition 9c. In other words, the d.c. level of 3.5 volts in slightly short of an absolute white level and the d.c. level of 2.7 volts is somewhat greater (lighter) than the black level. Though not shown in FIG. 2, the central window 9b, from which high frequency content is obtained, can also be visually highlighted, or emphasized, by adding a d.c. level adjustment into the video signal for that portion of the line scan.

Figure 3:
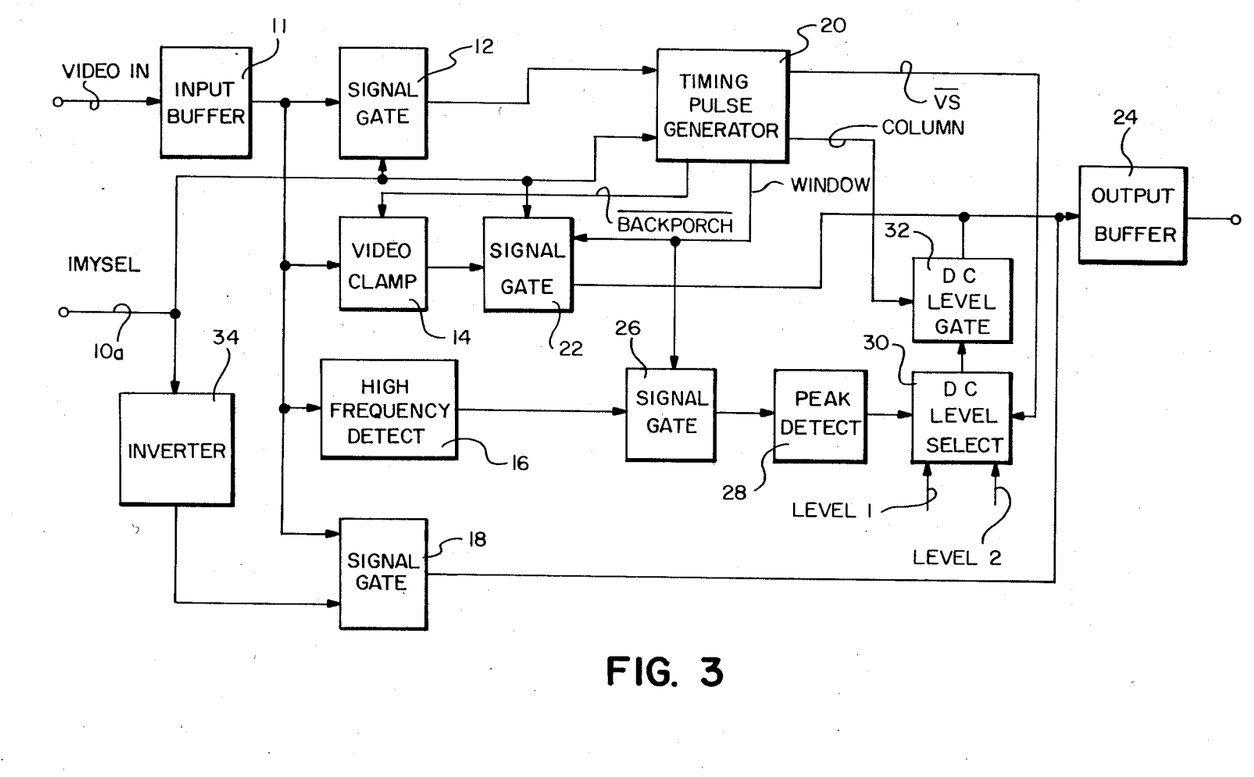
FIG. 3 is a block diagram of the focusing aid of FIG. 1.

A block diagram of the focusing aid circuit 8 is shown in FIG. 3. A video signal (from either the sensor or the playback circuit) is applied to an input buffer 11 of the focusing aid circuit 8 and thereafter distributed to a timing signal gate 12, a video clamping circuit 14, a high frequency detector 16 and a playback signal gate 18. The gate 12 connects to a timing pulse generator 20, which generates a vertical synchronizing signal $\overline{VS}$ and the timing signals WINDOW, COLUMN and $\overline{BACK\ PORCH}$. When activated by the timing signal $\overline{BACK\ PORCH}$, the video clamp 14 clamps the d.c. black level of the incoming video signal, e.g., to 2.5 volts (as shown in FIG. 2). The clamped signal is applied to a video signal gate 22. When conducting, the video gate 22 passes the clamped video to an output buffer 24.

The high frequency detector 16 provides a high frequency component of the video signal to a high frequency signal gate 26. The gate 26 is connected to a peak detector 28, which generates the aforementioned d.c. control signal. The control signal is accumulated in relation to a switching threshold in a d.c. level selection circuit 30. The timing signal $\overline{VS}$ causes the circuit 30 to reset for each field. A selected d.c. level is injected into the video signal when a d.c. level gate 32 is activated by the timing signal COLUMN from the timing pulse generator 20. When the accumulated control signal is less than the threshold, a d.c. level 1 (3.5 volts d.c.) is combined with the video signal; when the integrated control signal is greater than the threshold, a d.c. level 2 (2.7 volts d.c.) is combined with the video signal.

Figure 4:
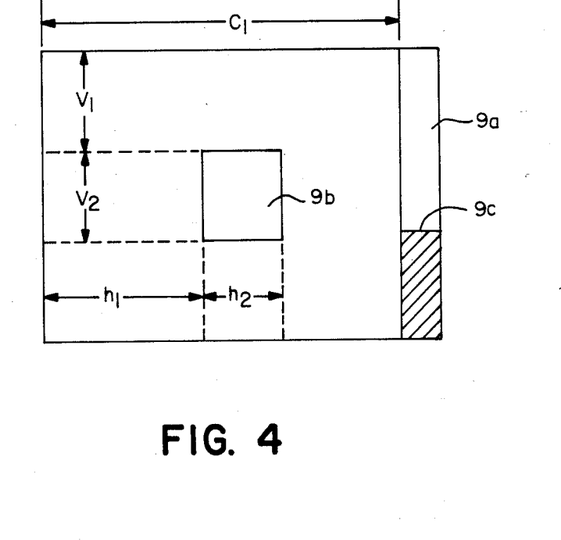
FIG. 4 is a raster diagram of the viewfinder display showing a focusing region and a columnar focusing indicator according to pertinent time-related scanning dimensions.

The high frequency gate 26 behaves like a closed switch in response to the timing signal WINDOW and passes high frequency content during the portion of the line scan corresponding to the central focusing window 9b (see FIG. 1). As shown in FIG. 4, the window 9b is offset vertically in the raster by a distance $v_1$ and horizontally by a distance $h_1$. The timing signal WINDOW from the timing pulse generator 20 is high during the period corresponding to a vertical transition $v_2$ and a horizontal transition $h_2$ that define the extremities of the window 9b. The WINDOW signal is also applied to the video gate 22 so that, as hereinbefore described, a d.c. level may be impressed upon the video to accentuate the window 9b. FIG. 4 also shows that the bar region 9c is offset horizontally in the raster by a distance $c_1$. In particular, the signal COLUMN goes high after a period corresponding to the distance $c_1$.

The circuit shown by FIG. 3 passes either playback video through the gate 18 to the output buffer 24 or scene preview video through the gates 12 and 22 to the timing pulse generator 20 and the output buffer 24 respectively. The gates 12, 18 and 22 are activated by a select signal IMYSEL (imager luma select) provided to the focusing aid circuit 8 on the line 10a from the playback/preview control circuit 10 (FIG. 1). When the select signal IMYSEL is high, the viewfinder is being used to preview and focus a scene prior to making a recording (preview mode); when low the viewfinder is displaying a previously recorded picture (playback mode). The select signal is inverted by an inverter 34 before application to the gate 18. The conditions of the gates 12 and 22, and the gate 18, are thus mutually opposed; that is, when gates 12 and 22 are conductive the gate 18 is non-conductive, and vice versa. In the scene preview mode, the gates 12 and 22 pass preview video to the timing pulse generator 20 and the output buffer 24, thereby activating the focusing aid circuit 8, while the gate 18 behaves like an open switch. In the playback mode, the gate 18 passes playback video to the output buffer 24 while the gates 12 and 22 behave like open switches, preventing playback video from reaching the timing pulse generator 20 or clamped video from reaching the output buffer 24.

Figure 5:
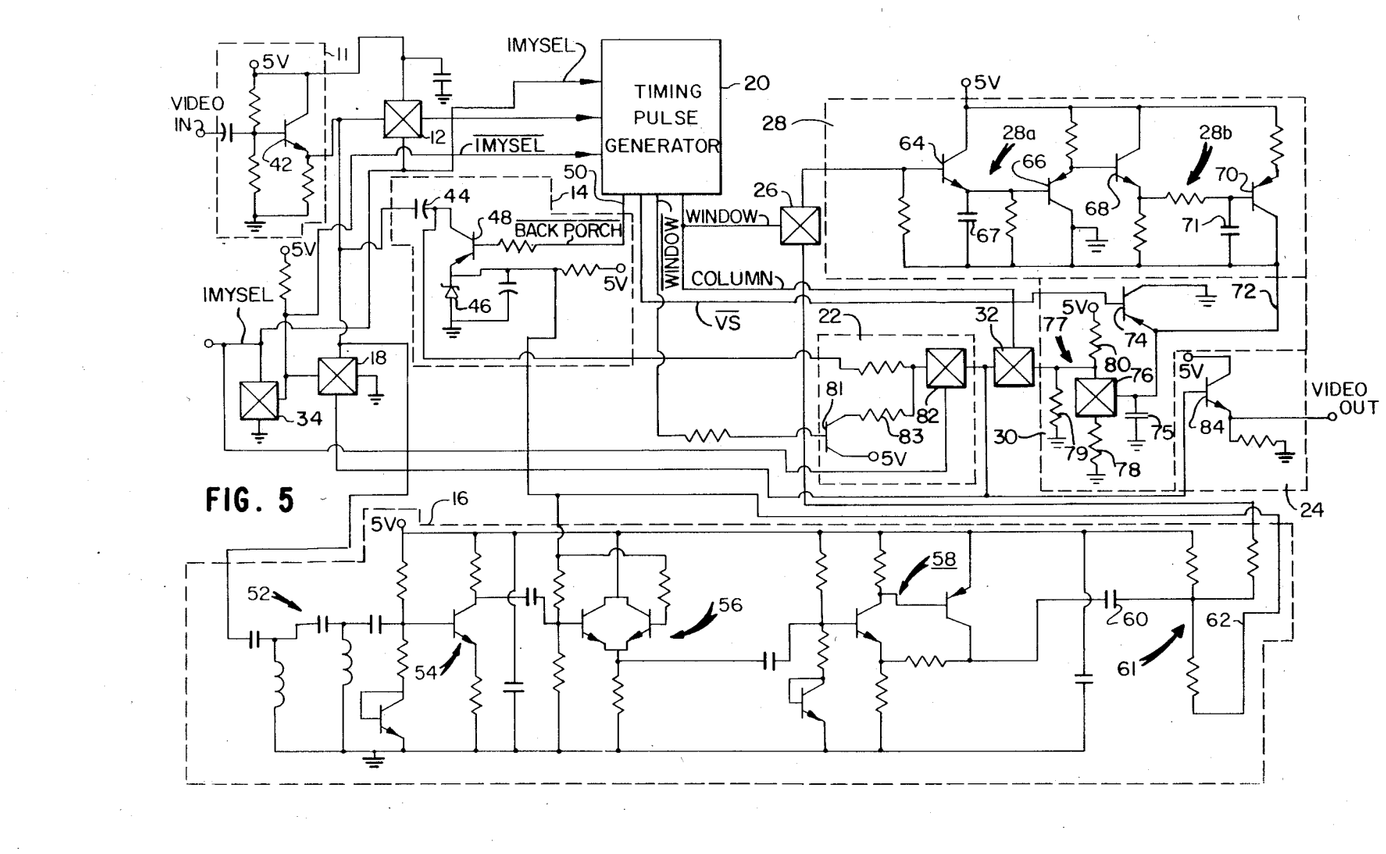
FIG. 5 is a detailed circuit diagram of the focusing aid diagram of FIG. 3.

Further circuit details of the focusing circuit block diagram of FIG. 3 are shown in FIG. 5. The same-numbered reference characters refer to the same components as referenced heretofore, including some components in broken line that include further circuit details. The video signal is coupled into the input buffer 11, which includes a transistor 42 biased in an emitter-follower configuration and coupled through its output to the components described in connection with FIG. 3. In particular, the output of the transistor 42 is a.c. coupled through a capacitor 44 in the clamp 14 to the video gate 22. The voltage level on the output side of the capacitor 44 is clamped to approximately 2.5 volts d.c. by a 2.5 volt reference diode 46 connected into the emitter circuit of a transistor 48. The base of the transistor 48 receives the timing control signal $\overline{BACKPORCH}$ on a line 50 from the timing pulse generator 20. When $\overline{BACKPORCH}$ is low, the transistor 48 conducts and the video is accordingly clamped to 2.5 volts d.c.

The output of the transistor 42 is further applied to a five-pole highpass filter 52 in the high frequency detection circuit 16. The output from the filter 52 is amplified by an amplifier stage 54 and applied to a clipping circuit 56. In order to reduce the effect of noise upon focusing information, the clipping level is set according to the signal-to-noise ratio of the camera and the gain of the preceding amplifier stage 54 so as to pass only the positive peaks due to high frequency content. The clipper output is then passed through an additional amplifier stage 58 and a.c.-coupled through a capacitor 60 to the high frequency gate 26. The output side of the capacitor 60 is clamped to a voltage slightly higher than the switching threshold of the level selection circuit 30 (e.g., 3 volts d.c.). This clamping voltage is provided by a voltage divider 61 connected between a 5 volt d.c. supply and a 2.5 volt d.c. reference on a line 62 coming from the video clamp 14.

The pulsations representative of high frequency content within the central window 9b are passed through the high frequency gate 26 (when WINDOW is high) to the peak detector circuit 28, which is arranged in two stages 28a and 28b with four transistors 64, 66, 68 and 70 in complementary polarity for temperature compensation. The first stage includes transistors 64 and 66 and a capacitor 67 for registering a quick charge accumulation from the signal spikes representing high frequency content, while the second stage includes transistors 68 and 70 and a capacitor 71 for holding the charge over a longer period. The voltage formed across the capacitor 71, which has an amplitude that varies according to the magnitude of high frequency content, is converted into a d.c. control current at the collector of the transistor 70 and applied on a line 72 to the d.c. level selection circuit 30. The d.c. control current varies inversely with the voltage across the capacitor 71, that is, a decreasing voltage generates an increasing control current, and vice versa.

The control current is applied to the emitter of a reset transistor 74, to a capacitor 75 and to the switching electrode of a switch 76. The switch 76 is part of a switchable voltage divider 77 comprised of resistors 78, 79 and 80. The output of the voltage divider 77 is applied to the d.c. level gate 32. When the switch 76 is non-conductive, the voltage divider 77 is formed of resistors 79 and 80 and the divided voltage is approximately, in this embodiment, 3.5 volts d.c. When the switch 76 is conductive, the voltage divider 77 is formed of the parallel combination of resistors 78 and 79 in series with the resistor 80, and the divided voltage is stepped down to approximately 2.7 volts d.c. The switch 76 is triggered, and the output of the voltage divider 77 is switched, when the voltage across the capacitor 75 exceeds the switching potential of the switch 76. Since the capacitor 75 is charged by the control current from the peak detector 28, the time taken for the capacitor 75 to reach the switching potential is a function of the current flow, that is, of the high frequency content. The current flow is relatively greater in the absence of high frequency content and, therefore, the switching potential is quickly reached. In the presence of high frequency content, the current flow is diminished and a greater time is taken to reach the switching potential. Consequently, a higher d.c. level (3.5 volts) is applied to the d.c. level gate 32 prior to switching and a lower d.c. level (2.7 volts) is applied to the d.c. level gate 32 after switching.

The d.c. level gate 32 behaves like a closed switch only when the timing signal COLUMN is high, that is, only at the end of each scan line. Thus the combination of the d.c. level from the voltage divider 77 with the clamped video signal from the gate 22 is only obtained during this time. The higher d.c. level obtained prior to switching of the voltage divider 77 corresponds to the bright region above the transition 9c in the column 9a. The lower d.c. level obtained after switching corresponds to the dark region below the transition 9c. The moment of switching between the two d.c. levels corresponds to the transition 9c. Since the moment of switching depends on the rapidity of charging the capacitor 75, which in turn depends on the amount of control current from the peak detector 28, the transition 9c rises and falls with the level of the control current, that is, in reverse proportion to high frequency content. The lowest position of the transition 9c therefore corresponds to the least amount of control current, which in turn corresponds to maximum high frequency content or optimum focus.

In order that the transition 9c occurs independent of the scanning operation, that is, dependent only upon high frequency content, the capacitor 75 is periodically reset in relation to the video image repetition rate. For this purpose, the vertical synchronizing signal $\overline{VS}$ is applied to the base of the reset transistor 74 and, by grounding the control line 72 on its emitter, grounds the capacitor 75 at the beginning of each video field. Moreover, the time constant of the charging circuit including the capacitor 75 is selected so that the switching potential of the switch 76 is always reached during a video field. In the preferred embodiment, another d.c. shift is applied to the clamped video signal in the central window 9b to delineate the area from which high frequency content is obtained. The video gate 22 includes a transistor 81 connected between the 5 volt d.c. supply and the input of a switch 82, which also receives the clamped video signal. Since the timing signal WINDOW is applied to the base of the transistor 81 and raised high during the period of the window 9b, a d.c. potential is combined with the video signal during this period. A resistor 83 steps down this potential sufficiently so that the d.c. level generates a constant brightness cast in the window 9b that highlights the area without destroying the video image.

The scene preview video is thus modified for d.c. level in both the window region 9b and the columnar region 9a and then passed directly to the output buffer 24, which includes a transistor 84 connected in emitter-follower configuration, and therefrom through the video output terminal to the viewfinder 9 (FIG. 1). In the playback mode, the select signal IMYSEL is low ($\overline{IMYSEL}$ is high). The gate 12 is thus non-conductive while the gate 18 is conductive. The playback video signal passes through the gate 18 directly to the output buffer 24. Thus the brightness modification provided by the d.c. level selection circuit 30 is bypassed and the column 9a does not appear in the display raster in the viewfinder 9. In addition, the timing pulse generator 20 inactivates the WINDOW signal and the d.c. level in the window 9b is unaffected.

Figure 6:
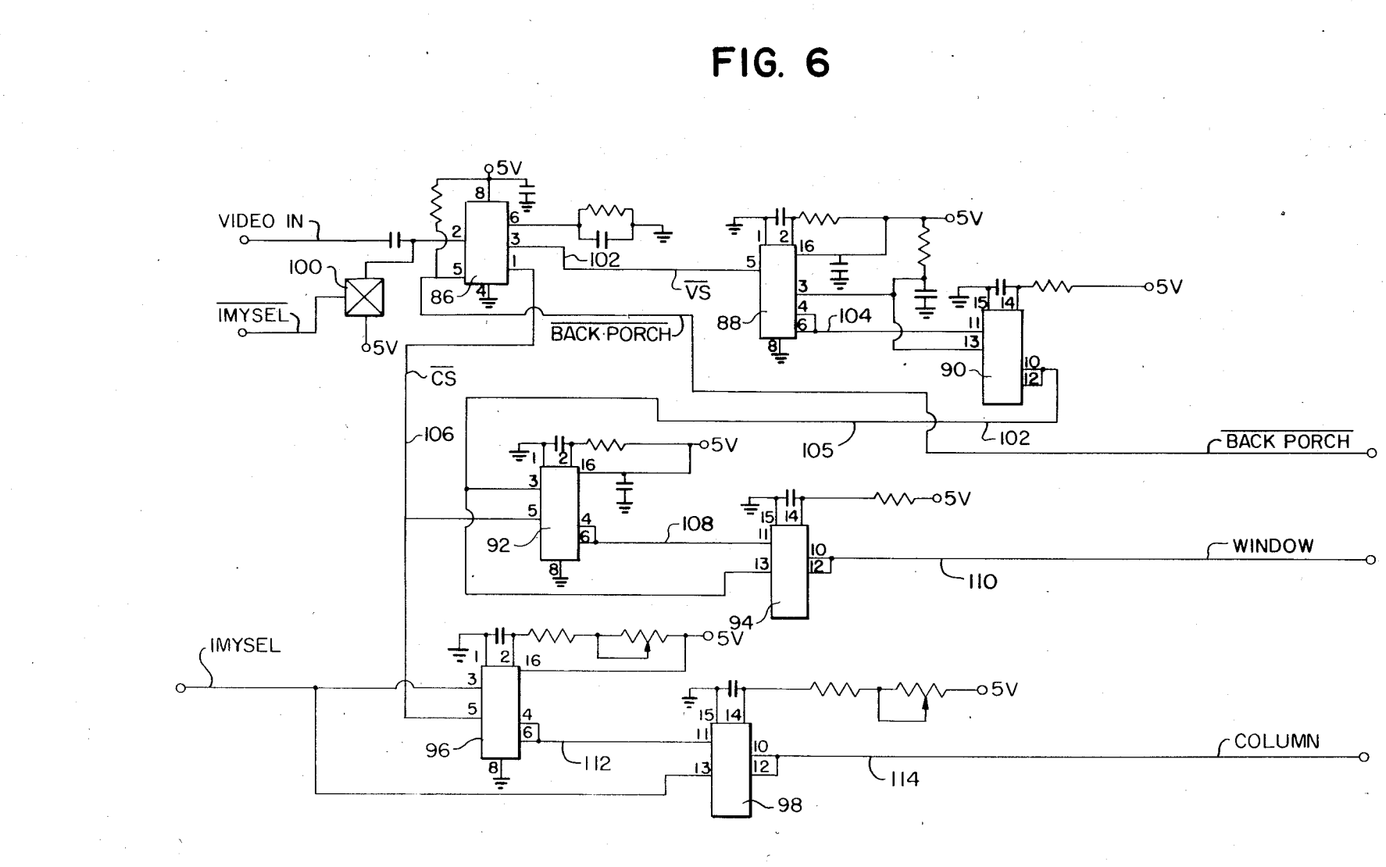
FIG. 6 is a circuit diagram of the timing pulse generator shown in FIG. 5.
Figure 7:
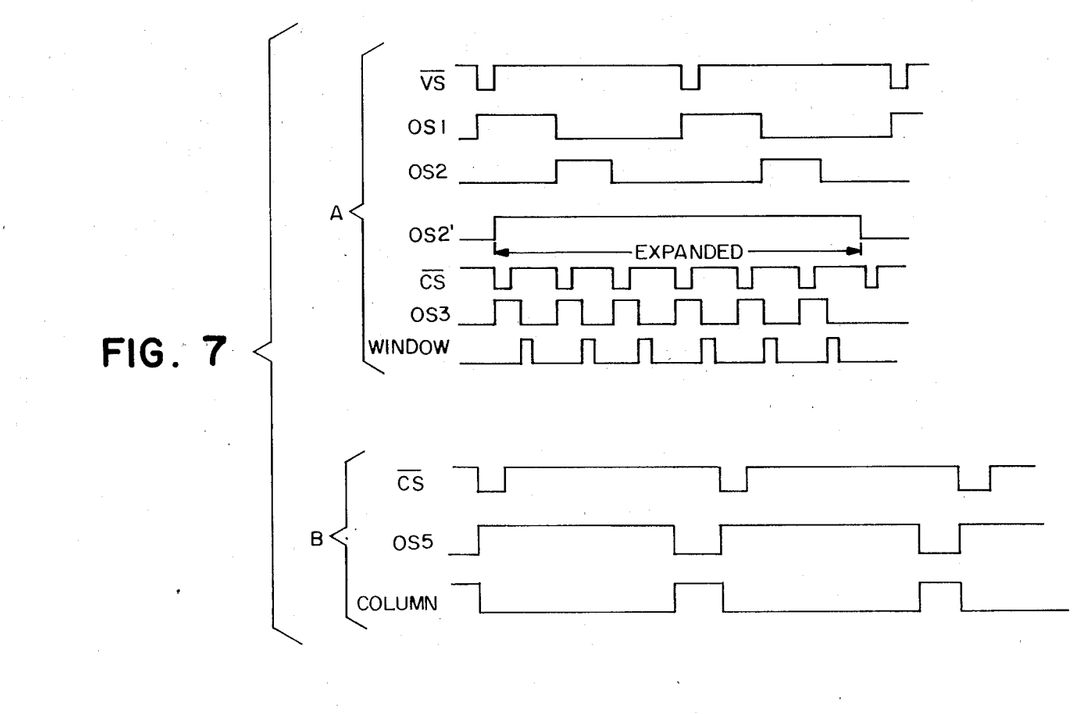
FIGS. 7A and 7B are charts of timing waveforms produced by the timing pulse generator of FIG. 6.

The timing pulse generator 20 is shown in further circuit detail in FIG. 6, together with waveforms of timing signals in FIG. 7. The circuit includes a sync separator 86 and six monostable multivibrators (one-shots) 88, 90, 92, 94, 96 and 98. Though specific parts are not required, the sync separator pin-outs are for a LM 1881 chip and the multivibrator pin-outs are for each half of a 74HC4538 dual one-shot. The video is brought into the sync separator 86 only when the gate 12 (see FIGS. 3 and 5) is conductive, that is, when the control signal IMYSEL is high and the scene is being previewed by the user. Conversely, during playback (when $\overline{IMYSEL}$ is high) a gate 100 becomes conductive and forces the input line of the sync separator 86 to 5 volts d.c. This deactivates the separator 86 and prevents oscillations in its output.

When activated, the sync separator 86 produces the vertical sync $\overline{VS}$, composite sync $\overline{CS}$ and $\overline{BACK\ PORCH}$ signals. During scene preview, the vertical sync signal $\overline{VS}$ is generated by the sync separator 86 on a line 102 and applied to the first one-shot 88, which generates a waveform OS1 (FIG. 7A) that remains high for a period corresponding to the vertical transition $v_1$ in FIG. 4. The waveform OS1 is applied on a line 104 to the one-shot 90, which in turn generates a waveform OS2 (FIG. 7A) that is connected by a line 105 to both one-shots 92 and 94. The waveform OS2 remains high during the vertical interval $v_2$ as shown in FIG. 4. (A single pulse of the waveform OS2 is shown expanded into the waveform OS2' in FIG. 7A, during which the subsequent one-shot waveforms in FIG. 7A occur.) During the time that OS2 is high, both one-shots 92 and 94 are enabled. Meanwhile the sync separator 86 has been producing the composite sync signal $\overline{CS}$ on the line 106, which connects to the one-shot 92. (Although fewer pulses are shown for sake of brevity, preferably the waveform OS2 spans sufficient composite sync pulses to define the desired vertical dimension of the window 9b.)

Upon the occurrence of the first composite signal $\overline{CS}$ after the one-shot 92 has been enabled, the waveform OS3 is produced by the one-shot 92 and applied on a line 108 to the input of the one-shot 94. The waveform OS3 corresponds to the horizontal transition $h_1$ in FIG. 4. The falling edge of the waveform OS3 produces the waveform WINDOW on the output line 110 of the one-shot 94, which corresponds to the horizontal transition $h_2$ in FIG. 4. The waveform WINDOW defines the window 9b within which the focusing adjustment is observed. The composite sync signal $\overline{CS}$, shown further expanded in FIG. 7B, is also applied on the line 106 to the input of the one-shot 96. A waveform OS5 is produced by the one-shot 96, corresponding to the horizontal transition $c_1$ shown in FIG. 4, and applied to the input of the one-shot 98 on a line 112. The timing signal COLUMN is then produced by the one-shot 98 on a line 114.

Figure 8:
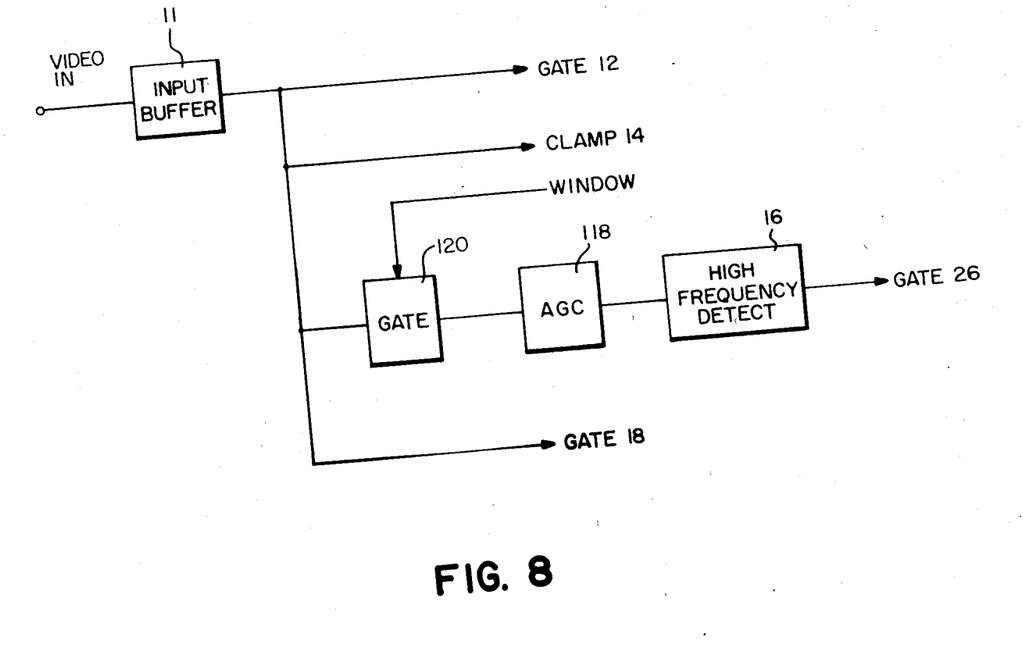
FIG. 8 is a modification of the circuit of FIG. 3 showing the addition of an automatic gain control circuit.

The focusing aid depends on an image level transition that can be detected as the imager is scanned. Since scanning is ordinarily done horizontally relative to the image, this means that the image should contain some sort of generally vertical transition in the window 9b (see FIG. 1) for high frequency content to be detected. It is also of interest that the response of the focusing aid is proportional to the contrast change present in the subject, that is, the greater the change in contrast, the longer the time taken to reach the switching threshold of the switch 76 as optimum focus is achieved. Since this effect is related less to optimum focus than to image contrast, it may be desirable to normalize the signal level applied to the high pass filter 52 so that its output is due to high frequency content alone and the brightness transition in the column region will respond to high frequencies independent of contrast. FIG. 8 shows a modification to the circuit of FIG. 3 in which an automatic gain control circuit 118 is included before the high frequency detection circuit 16 in order to automatically control the gain of the video from which the high frequency content is obtained. Since it is necessary to confine gain control to the window region 9b, the incoming video signal is gated to the gain control circuit 118 when a gate 120 is rendered conductive by the signal WINDOW from the timing pulse generator 20.

The invention has been described in detail with particular reference to a presently preferred embodiment, but it will be understood that variations and modifications can be effected within the spirit and scope of the invention.

What is claimed is:

1. In video apparatus of the type that isolates the high frequency content of a video signal and uses the high frequency content to modify a video display generated within an electronic viewfinder in order to indicate a properly focused video image, the improvement wherein said video apparatus comprises:
   means for generating a control signal that varies according to the high frequency content of the video signal as the video image is brought into focus;
   means for accumulating the control signal; and
   means responsive to the amplitude of the accumulated control signal for changing the d.c. level of the video signal generating the display in the viewfinder whereby the transition in brightness level in the viewfinder corresponds to the high frequency content of the video signal.

2. The apparatus as claimed in claim 1 in which said accumulating means is a capacitor.

3. The apparatus as claimed in claim 2 further including means for resetting said capacitor in relation to the video image repetition rate.

4. The apparatus as claimed in claim 1 in which said means responsive to the amplitude of the accumulated control signal for changing the d.c. level of the video signal is operative during a portion of the display.

5. The apparatus as claimed in claim 4 in which the portion of the display in which the d.c. level is subject to change corresponds to a like portion of each line scan and, therefore, to a columnar region of the display.

6. The apparatus as claimed in claim 1 in which said means responsive to the amplitude of the accumulated control signal for changing the d.c. level of the video signal comprises:
   a voltage divider having an output for providing either of two d.c. voltage levels;
   means for swtiching between said d.c. voltage levels in response to a predetermined amplitude of said accumulated control signal; and
   gating means for combining the output of said voltage divider with the video signal to provide a modified video d.c. level.

7. The apparatus as claimed in claim 6 in which said gating means is operative only during a portion of the line scan corresponding to a columnar section of the video display.

8. The apparatus as claimed in claim 1 in which said control signal varies according to high frequency content derived from a region of the display unaffected by the changing d.c. level provided by said means responsive to the amplitude of said accumulated control signal.

9. In video apparatus of the type that isolates the high frequency content of a video signal and uses the high frequency content to modify a video display generated within an electronic viewfinder in order to indicate a properly focused video image, the improvement wherein said video apparatus comprises:
   means for generating a control signal that varies according to the high frequency content of the video signal as the video image is brought into focus;
   charge storage means for generating a switching potential from the control signal; means coupled to said video display of the electronic viewfinder for combining one of two d.c. voltages with the video signal, one voltage corresponding to a relatively white level and the other to a relatively black level;
   means responsive to a predetermined value of the switching potential for switching between said d.c. voltages whereby the instance of switching generates a shift in the brightness level in the viewfinder;
   means for resetting said charge storage means in relation to the vertical synchronization of the video signal; and
   means for restricting the operation of said combining means to a like portion of each video line so that the shift in brightness levels is restricted to a column in the video display.

10. The apparatus as claimed in claim 9 in which said charge storage means for generating a switching potential is a capacitor.

11. In a manually-focused video camera having a signal processing circuit of the type that isolates a high frequency component of a video signal and uses the isolated high frequency component to modify the video display in an electronic viewfinder, the improvement wherein the signal processing circuit comprises:
   means responsive to the high frequency component for generating a focus-related signal from the video signal;
   means for generating a d.c. control current that is inversely proportional to the amplitude of the focus-related signal;
   a capacitor;

means for charging said capacitor with said control current for each field of the video signal;

means responsive to the d.c. potential across said capacitor for selecting between two d.c. voltage levels;

means for clamping the black level of the video signal to a predetermined d.c. voltage to produce a clamped video signal;

means for generating a timing signal for defining a selected area of the video display; and means responsive to said timing signal for injecting said selected d.c. voltage level into said clamped video signal thereby producing a brightness shift in the display video level that is time-wise proportional to the high frequency component present in the video signal.

12. The apparatus as claimed in claim 11 in which said focus-related generating means comprises:
   a high pass filter for separating said high frequency component of the video signal;
   a clipping circuit for removing low amplitude noise from the high frequency component to provide a clipped signal; and
   a voltage clamper for clamping the base level of the clipped signal to an approximate black level of the video signal.

13. The apparatus as claimed in claim 11 in which said means for generating a d.c. control voltage comprises:
   a first peak detector for quickly responding to rapid amplitude changes in the focus-related signal; and
   a second peak detector connected to said first peak detector for holding the peak amplitude change over a relatively longer period.

* * * * *